Aug. 12, 1941.  E. C. HORTON  2,252,510
WINDSHIELD CLEANER
Filed Jan. 4, 1938

INVENTOR
Erwin C. Horton,
BY
Beau, Brooks, Buckley & Beau.
ATTORNEYS

Patented Aug. 12, 1941

2,252,510

UNITED STATES PATENT OFFICE 2,252,510

WINDSHIELD CLEANER

Erwin C. Horton, Hamburg, N. Y., assignor to Trico Products Corporation, Buffalo, N. Y.

Application January 4, 1938, Serial No. 183,327

7 Claims. (Cl. 15—250)

This invention relates to a windshield cleaner and more particularly to the mounting connection between the wiper and the wiper carrying arm.

The present invention has for its object to provide an improved connection between the wiper and its carrying arm by which the replaceable wiper, while permitted certain freedom of movement with respect to the carrying arm, is firmly supported on the latter in its operative position whereby the usefulness, life and efficiency of the blade is increased.

Figure 2:
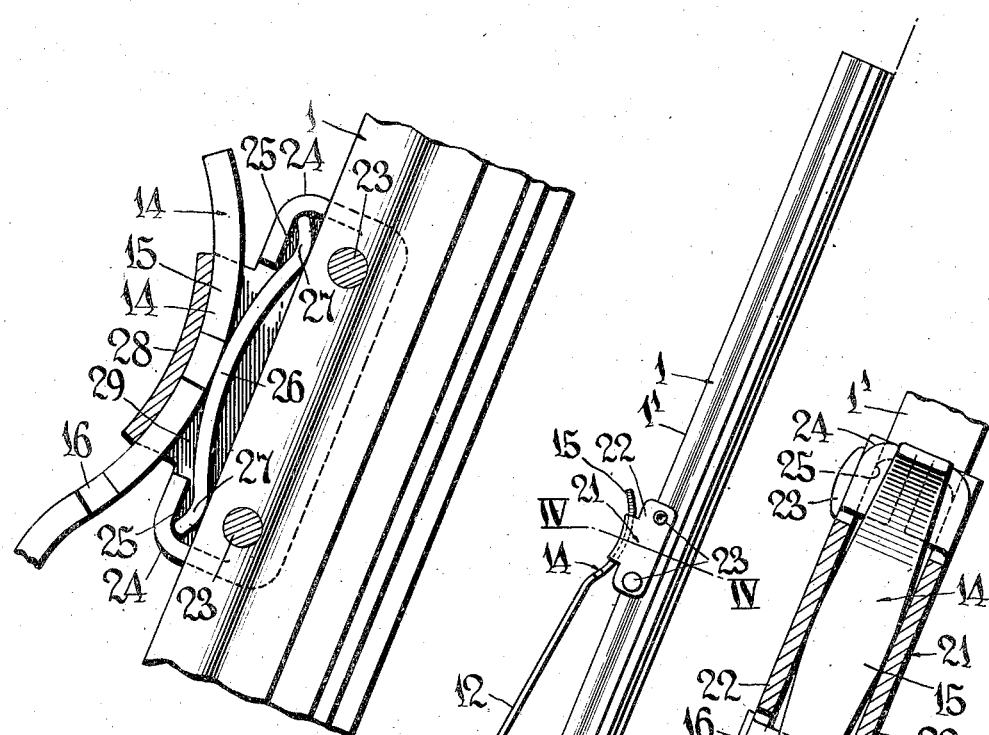
Fig. 2 is an enlarged fragmentary side view of the wiper with parts shown in section.

Referring more particularly to the drawing the numeral 1 designates a wiper or wiping blade which is reciprocated on the windshield 2 by an actuating arm 3, the latter being carried by and secured to the shaft 4 mounted for reciprocation in a well-known manner.

In the illustrated embodiment of the invention, arm 3 comprises an inner member 5 secured to shaft 4 by a cap nut 6 for reciprocation therewith, an intermediate member 7 pivotally connected to member 5, as at 8, and an outer member 12 formed of a strip of resilient metal and secured intermediate its free ends to member 7 adjacent its outer end, as by a rivet 11.

In the operating position of arm 3 the inner free end portion 10 of spring member 12 is flexed, its reaction being against a small roller 9 rotatively mounted upon member 5 beyond the pivotal connection 8, so that the outer curved end 14 of the spring 12 is resiliently directed toward the windshield, thereby resiliently maintaining the wiping blade 1 upon the windshield.

The wiping blade 1 intermediate its ends is provided with an attaching clip 21 which, according to the preferred embodiment, is formed separately from the metal frame or backing 1' of the wiper and of generally U-shape, its side walls 22 being secured in straddling relation over the backing member by rivets 23. The terminal end portions 24 of side walls 22, being turned inwardly toward each other, provide a pair of spaced recesses or pockets 25 in which the curved end portions 27 of a leaf spring 26 are retained for limited sliding movement upon the back of the wiper. The recesses 25, while permitting spring 26 ample freedom of movement for efficient action, prevent accidental displacement thereof. The intermediate portion of spring 26 is bowed outwardly to normally lie in proximity to a longitudinally curved and overlying wall 28 joining the side walls 22 between and outwardly of recesses 25 and thereby defines a chamber 29 in which spring 26 operates. The opposite ends of the chamber open out over the terminal portions 24, which latter define fixed approaches over the ends of the spring 26 to permit the insertion of the curved tongue 14 into such chamber for engagement by the spring.

Figure 4:
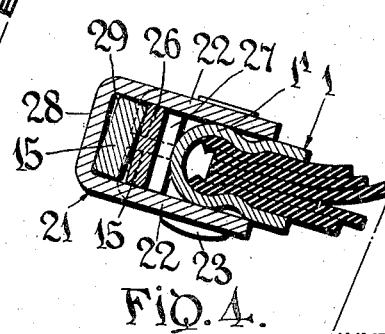
Fig. 4 is an enlarged cross-sectional view taken on line IV—IV of Fig. 1.

The curved end portion 14 of spring member 12 is reduced in width to form a wiper attaching tongue 15. This construction provides shoulders 16 at the junction of the tongue with the body portion of the spring member for limiting insertion of the tongue into the clip. When inserting the tongue the spring 26 is urged back into the chamber and exerts a binding force on the tongue. The action of spring 26 also provides a force tending to hold the wiper normal to the windshield and at the same time permit the wiper to yield laterally for assuming the proper wiping angle or inclination to the windshield (Fig. 4).

Figure 3:
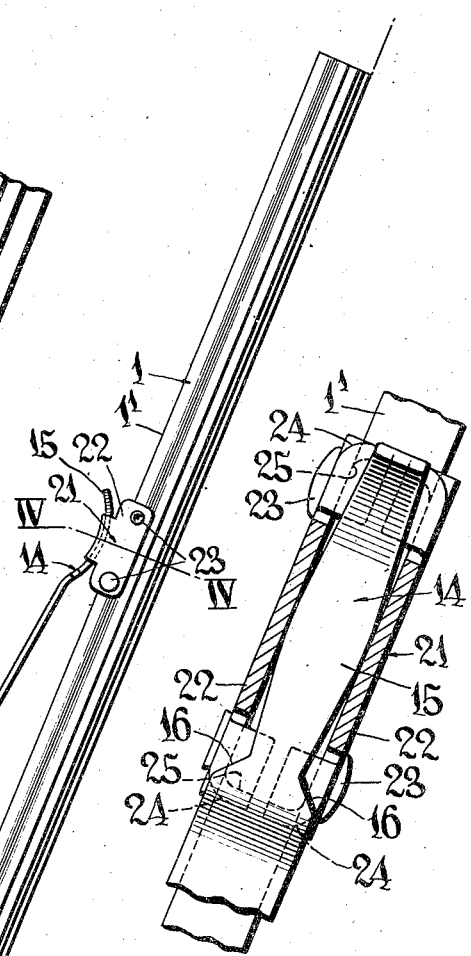
Fig. 3 is an enlarged fragmentary plan view with portions removed to more clearly illustrate the invention.
Figure 1:
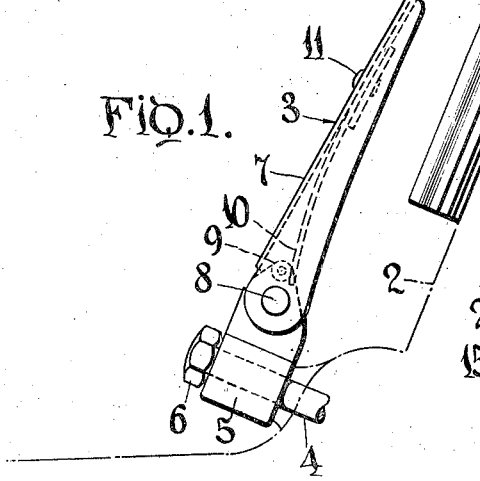
Fig. 1 is a side elevational view of the invention as applied to a fragmentary windshield portion of a car, the latter being shown in broken lines.

The lateral edges of the tongue may be tapered from the medial portion towards the shoulders and towards the outer end of the tongue, as shown in Fig. 3, and thus provide a slight convexity lengthwise thereof to permit restricted pivotal movement of the wiper about an axis normal to the windshield.

The lengthwise curvature of the outer face of the tongue and the lengthwise curvature of the inner face of the wall 28 are substantially the same and transversely flat, and consequently the spring 26 will tend to maintain these parts in conforming engagement. However, if either end portion of the wiper encounters resistance during its movement across the windshield, that end of the wiper will tend to pivot about the tongue with the influence of spring 26 providing a cushioning effect. Under these circumstances the conforming engagement will be temporarily broken and as soon as the cause of resistance is passed over or removed, spring 26 will restore the conforming engagement of the parts.

The greater length of the tongue over that of the wall permits the wiper to move along the tongue to adjust itself to the surface being wiped and since the arm and wiper must be bodily moved away from the windshield about pivotal connection 8, before the wiper can be bodily swung about the common axis of curvature of the tongue and the wall to be removed, the possibility of accidental displacement of the wiper in its operative position is remote. Consequently, the wiper is secure in its attachment to the spring arm by virtue of the conforming or nesting engagement therebetween, while at the same time it is readily removable for replacement.

Therefore, it appears that the present invention provides a connection between the arm and wiper which is simple in design and practical in construction and operation.

It should be understood that the disclosure and description are merely exemplary of the principles of the invention and that various changes, reversal of parts and modifications thereof may be made without departing from the spirit or scope of the claims.

What is claimed is:

1. In a windshield cleaner, means for detachably connecting a wiper to an actuating arm, wherein one of the aforesaid elements has a curved terminal tongue and the other of said elements has a wall extending lengthwise of and conformably receiving the curved tongue, said wall and tongue having transversely flat intermediate portions coacting to permit the wiper to rock laterally for assuming a dragging position during its operative movement, such lateral rocking movement occurring at a point intermediate the opposite ends of the wall, said wall and tongue also being adapted for relative locking about a transverse axis at one end or the other of the wall as a point of fulcrum which point of fulcrum is offset and spaced from the intermediate point aforesaid, and a resilient device yieldably acting on the opposite side of the tongue in opposition to such intermediate point and consequently at a point offset from the point of fulcrum to provide increased resistance to rocking movement about the transverse axis relative to the resistance offered the lateral rocking.

2. In a windshield cleaner, means for detachably connecting a wiper element to an actuating arm element, wherein one of the aforesaid elements has a curved tongue tapered lengthwise in opposite directions from a relatively wide medial portion to accord a general convexity to the opposite sides of the tongue, and the other of said elements has a chamber, a transverse wall of which is curved for conforming engagement with the curved surface of said tongue and the side walls of which are substantially flat to rock on the opposite sides of said tongue.

3. A windshield cleaner comprising a wiper, an actuating arm therefor, one of the aforesaid elements having a curved tongue attenuating longitudinally in width in opposite directions from a relatively wide medial portion, and the other of said elements having a chamber with a top wall curved for conforming engagement with the curved surface of said tongue, the side walls of the chamber adapted to rock on the sides of the tongue, and resilient means within said chamber for yieldingly maintaining the conforming engagement of said curved wall on said tongue.

4. A windshield cleaner comprising a wiper element, an actuating arm element therefor, one of said elements having an elongated curved portion with lateral edges slightly convexed lengthwise thereof and the other of said elements having a chamber, one wall of which is curved to nestingly receive said curved portion for conforming engagement therewith and the side walls of which are arranged to permit limited pivoting movement of the chamber on the convex edges, and means yieldably maintaining the nested engagement.

5. In a windshield cleaner, means for detachably connecting a wiper to an actuating arm, wherein one of the aforesaid elements has a curved tongue and the other of said elements has a chamber for receiving the tongue, the top wall of the chamber extending lengthwise of and curved about the same axis as the tongue for slidable and conformable engagement therewith, and resilient means arranged within said chamber and having a part resiliently engaging the opposite side of the tongue in opposition to the top wall for holding the wiper on the arm, said resilient means permitting the wiper to rock on the arm about a transverse axis at one end of the top wall as a point of fulcrum and under greater resistance relative to that normally acting to hold the wiper on the arm.

6. A wiper element for attachment to the curved terminal tongue of an actuating arm in which the curvature is about a transverse axis, comprising a wiper body having a back wall portion provided with a curvature in like conformity to that of the tongue for snug nesting and sliding engagement therewith, the axis of curvature of the back wall portion being common to that of the arm tongue, said wiper body having opposing pockets adjacent the ends of the back wall and spaced therebeneath to define therewith entranceways through which the arm tongue may be inserted, and a bowed spring underlying the back wall for pressing an engaged tongue into such nesting and conforming engagement therewith, the opposite ends of the bowed spring being engaged in the pockets with the convex intermediate portion pressing toward the back wall, the top walls of the pockets serving as approaches for the tongue to guide the latter over the ends of the spring when being inserted through either entranceway.

7. A wiper for attachment to an actuating arm, comprising an elongated body having a longitudinal chamber in its back with side and top walls, such chamber opening at one end through an entranceway defined by one end of the top wall and an underlying wall, the latter extending in the general direction of the top wall and constituting an approach to the chamber while at the same time providing an underlying pocket, and a bowed leaf spring arranged in the chamber and having its convex surface disposed in opposition to the top wall to press an interposed actuating arm thereagainst, one end of the spring being engaged in the pocket whereby said approach constituting wall will guide such arm over the end of the spring when inserting the arm between the spring and said opposing top wall of the chamber.

ERWIN C. HORTON.

CERTIFICATE OF CORRECTION.

Patent No. 2,252,510.  August 12, 1941.

ERWIN C. HORTON.

It is hereby certified that error appears in the printed specification of the above numbered patent requiring correction as follows: Page 2, first column, line 37, claim 1, for the word "locking" read --rocking--; and that the said Letters Patent should be read with this correction therein that the same may conform to the record of the case in the Patent Office.

Signed and sealed this 16th day of September, A. D. 1941.

(Seal)

Henry Van Arsdale,
Acting Commissioner of Patents.